United States Patent
Quan

(10) Patent No.: US 11,726,853 B2
(45) Date of Patent: Aug. 15, 2023

(54) ELECTRONIC CONTROL DEVICE

(71) Applicant: Hitachi Astemo, Ltd., Hitachinaka (JP)

(72) Inventor: Qixian Quan, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 29 days.

(21) Appl. No.: 17/604,968

(22) PCT Filed: Apr. 3, 2020

(86) PCT No.: PCT/JP2020/015288
§ 371 (c)(1),
(2) Date: Oct. 19, 2021

(87) PCT Pub. No.: WO2020/217928
PCT Pub. Date: Oct. 29, 2020

(65) Prior Publication Data
US 2022/0222135 A1   Jul. 14, 2022

(30) Foreign Application Priority Data
Apr. 25, 2019   (JP) .............................. 2019-083617

(51) Int. Cl.
G06F 11/07   (2006.01)
(52) U.S. Cl.
CPC ........ G06F 11/0757 (2013.01); G06F 11/079 (2013.01)
(58) Field of Classification Search
CPC .......................... G06F 11/0757; G06F 11/079
See application file for complete search history.

(56) References Cited

U.S. PATENT DOCUMENTS

| | | | | |
|---|---|---|---|---|
| 6,883,123 B2 * | 4/2005 | Hashimoto | ........... | G06F 11/079 714/41 |
| 8,677,185 B2 * | 3/2014 | Sawaguchi | ......... | G06F 11/0721 714/45 |
| 8,909,997 B2 * | 12/2014 | Fuchigami | ............ | G06F 11/079 714/55 |
| 2010/0299565 A1 | 11/2010 | Muro et al. | | |

FOREIGN PATENT DOCUMENTS

| | | |
|---|---|---|
| JP | H8-142794 A | 6/1996 |
| JP | 11-167505 A | 6/1999 |
| WO | 2009098777 A1 | 8/2009 |

OTHER PUBLICATIONS

International Search Report, PCT/JP2020/015288, dated Sep. 8, 2020 (4 pages).

* cited by examiner

*Primary Examiner* — Nadeem Iqbal
(74) *Attorney, Agent, or Firm* — Volpe Koenig

(57) ABSTRACT

Provided is an electronic control unit capable of performing fault diagnosis of a watchdog timer circuit without delaying start of typical processing of a computer. A microcomputer termination processing unit 200 stops outputting a pulse to a watchdog timer circuit 101 in response to execution of termination processing of a microcomputer 100. When a reset signal is not output from the watchdog timer circuit 101 even when a predetermined time has elapsed since the stop of the output of the pulse, a watchdog timer circuit fault diagnosis unit 201 writes abnormality information indicating that an abnormality has occurred in the watchdog timer circuit 101 into the nonvolatile memory 102.

7 Claims, 4 Drawing Sheets

ELECTRONIC CONTROL DEVICE

TECHNICAL FIELD

The invention relates to an electronic control device, and particularly to an electronic control unit including a watchdog timer circuit that monitors a computer.

BACKGROUND ART

As is well known, a watchdog timer circuit is a hardware circuit used to monitor a state of a computer. Monitoring is performed by receiving a pulse transmitted at a constant cycle from a computer to be monitored, and time-out is detected when no pulse is received for a predetermined time or more, and it is determined that an abnormality has occurred in the computer. If this watchdog timer circuit is faulty, it becomes difficult to ensure the reliability of a system since it is difficult to detect computer runaway.

PTL 1 below discloses a technique in which a microcomputer itself generates a program runaway state immediately after power supply, and determines whether or not a reset signal is supplied from a watchdog timer circuit after a lapse of a predetermined time from the occurrence of the runaway state, thereby performing fault diagnosis of the watchdog timer circuit.

CITATION LIST

Patent Literature

PTL 1: JP H8-142794 A

SUMMARY OF INVENTION

Technical Problem

In conventional techniques, there is a problem that the start of typical processing of a computer is delayed due to the diagnosis of the watchdog timer circuit.

For example, in a method for diagnosing the watchdog timer circuit described in PTL 1, the fault diagnosis of the watchdog timer circuit is performed at the time of activating the microcomputer. For this purpose, it is necessary to wait until the watchdog timer circuit normally resets the microcomputer. Therefore, a delay occurs in the start of typical processing of the microcomputer. Therefore, for example, the activation performance of the system deteriorates.

The present invention has been made to solve such a problem, and an object thereof is to provide an electronic control unit capable of performing fault diagnosis of a watchdog timer circuit without delaying start of typical processing of a computer.

Solution to Problem

An electronic control unit according to the present invention is an electronic control unit including: a computer; a nonvolatile memory; and a watchdog timer circuit that monitors the computer. The computer includes: a computer termination processing unit that executes termination processing of the computer; and a fault diagnosis unit that diagnoses whether the watchdog timer circuit is faulty. The computer termination processing unit stops output of a pulse to the watchdog timer circuit in response to execution of the termination processing of the computer. The fault diagnosis unit writes abnormality information indicating that an abnormality has occurred in the watchdog timer circuit to the nonvolatile memory when a reset signal is not output from the watchdog timer circuit even after a predetermined time has elapsed since the stop of the output of the pulse.

Advantageous Effects of Invention

According to the electronic control unit of the present invention, it is possible to perform the fault diagnosis of the watchdog timer circuit without delaying the start of the typical processing of the computer.

DESCRIPTION OF EMBODIMENTS

Figure 1:
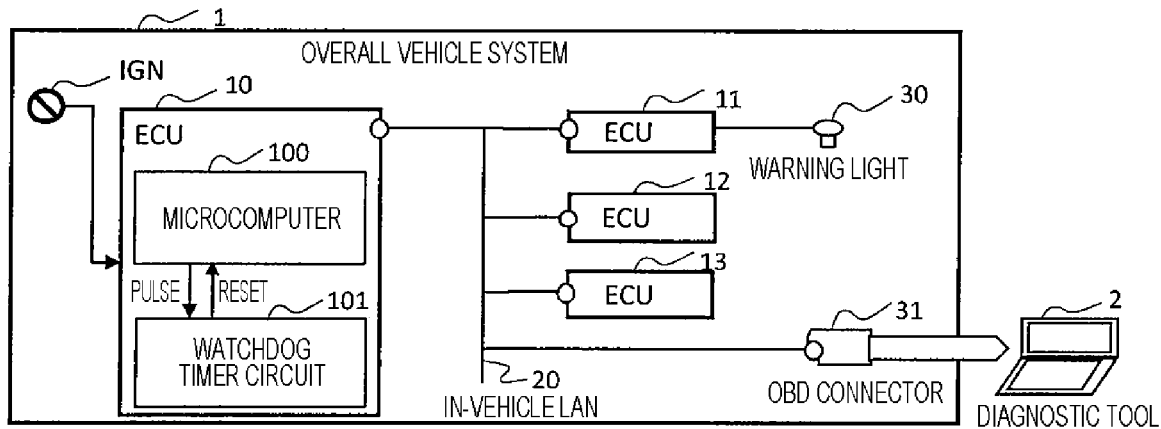
FIG. 1 is a block diagram illustrating a configuration including an electronic control unit (ECU 10) according to a first embodiment of the present invention.

Hereinafter, an embodiment for carrying out the present invention will be described with reference to the drawings. Note that the same reference signs indicate the same or equivalent parts in the drawings. In addition, the present invention is not limited to examples illustrated in the drawings.

First Embodiment

Hereinafter, an electronic control unit according to a first embodiment of the present invention will be described.

FIG. 1 is a block diagram illustrating a configuration of an overall vehicle system 1 including the electronic control unit according to the first embodiment. In the present embodiment, the electronic control unit is configured as an electronic control unit (ECU) mounted on a vehicle, for example, an ECU 10.

The overall vehicle system 1 illustrated in FIG. 1 includes the ECU 10 according to the first embodiment, other ECUs 11, 12, and 13, and a warning light 30.

An ignition switch IGN is connected to the ECU 10, and the ECU 10 can acquire a state of the ignition switch. In addition, the ECU 10 is connected to the ECUs 11, 12, and 13 via an in-vehicle LAN 20 (in-vehicle communication network) which is a communication network, to be capable of communicating with each other and can transmit and receive information to and from the ECUs 11, 12, and 13.

The warning light 30 is connected to the ECU 11, and the ECU 10 can control an operation of the warning light 30 via the ECU 11. The warning light 30 is a display means for notifying that a watchdog timer circuit 101 has failed by being turned on, and the ECU 10 notifies a user that the watchdog timer circuit 101 is faulty by turning on the warning light 30.

Further, the in-vehicle LAN 20 is connected with an OBD connector 31, and a diagnostic tool 2 can be connected via the OBD connector 31. In this manner, the ECU 11 can communicate with the diagnostic tool 2 via the in-vehicle LAN 20 and the OBD connector 31. The diagnostic tool 2 can read information on a fault of the watchdog timer circuit 101 at any time by communicating with the ECU 10 via the OBD connector 31.

The ECU 10 includes a microcomputer 100 (computer) and the watchdog timer circuit 101 that monitors the microcomputer 100. Note that the microcomputer 100 is used as an example of an object to be monitored by the watchdog timer circuit 101 in the present embodiment, but the object to be monitored is not limited to the microcomputer, and may be any type of computer.

Note that a pulse and a reset signal are transmitted and received between the microcomputer 100 and the watchdog timer circuit 101 as illustrated in FIG. 1, which will be described later with reference to FIGS. 2 to 4 and the like.

Figure 2:
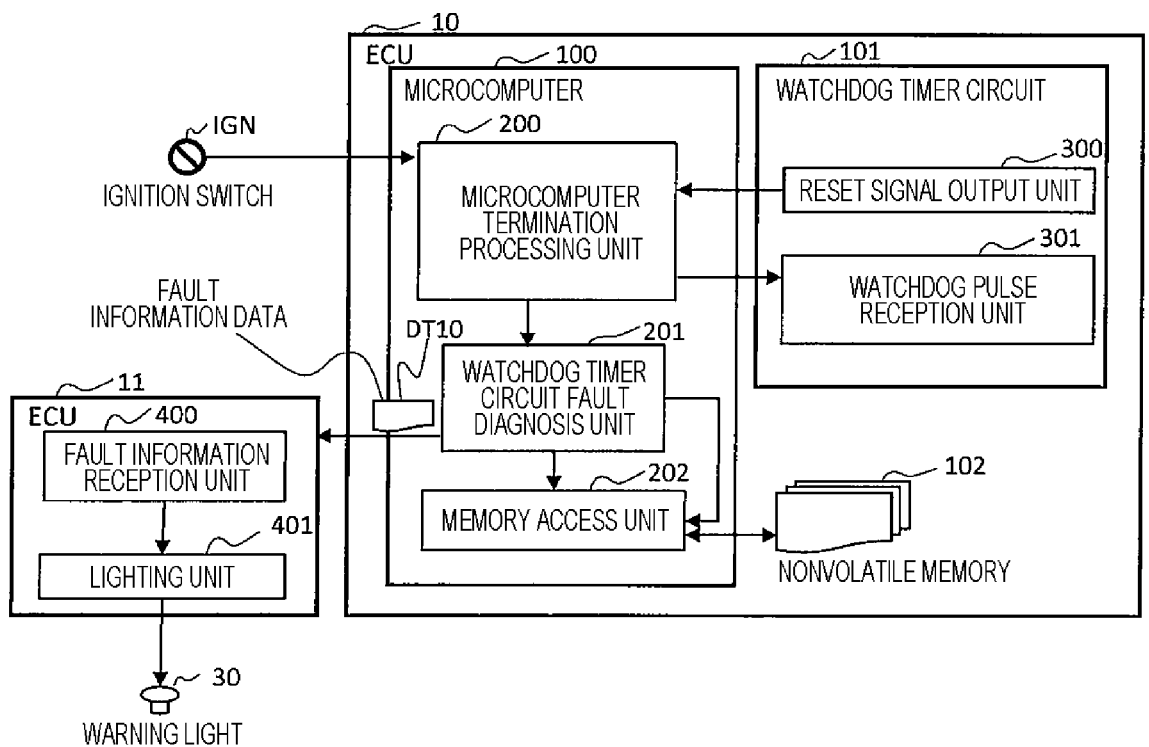
FIG. 2 is a block diagram illustrating an internal configuration of the electronic control unit of FIG. 1 in more detail.

FIG. 2 is a block diagram illustrating an internal configuration of the ECU 10 in more detail. The ECU 10 includes a nonvolatile memory 102 illustrated in FIG. 2 in addition to the microcomputer 100 and the watchdog timer circuit 101 also illustrated in FIG. 1.

The microcomputer 100 can be configured using a microcomputer having a known configuration or another computer. For example, the microcomputer 100 may include a calculation means and a storage means. The calculation means can be configured using, for example, a processor, and the storage means can be configured using, for example, a non-transitory storage medium. The non-transitory storage medium may be a volatile or nonvolatile storage medium. In addition, an operation of the microcomputer 100 according to the present embodiment may be realized as the calculation means executes a program stored in the storage means.

The microcomputer 100 includes a microcomputer termination processing unit 200 (computer termination processing unit), a watchdog timer circuit fault diagnosis unit 201 (fault diagnosis unit), and a memory access unit 202.

The microcomputer termination processing unit 200 executes termination processing of the microcomputer 100. The termination processing is a sequence executed when the power of the microcomputer 100 is turned off, and is executed, for example, when the ignition switch IGN is turned off.

The watchdog timer circuit fault diagnosis unit 201 diagnoses whether or not the watchdog timer circuit 101 is faulty. The watchdog timer circuit fault diagnosis unit 201 may be realized as the calculation means of the microcomputer 100 executes a program stored in the storage means of the microcomputer 100.

The memory access unit 202 accesses the nonvolatile memory 102, thereby writing and reading data. The memory access unit 202 may make data redundant when writing data in the nonvolatile memory 102.

Although a method for making data redundant can be arbitrarily designed, for example, the same data may be written in a plurality of locations (for example, the number of locations is two, but may be three or more) of the nonvolatile memory 102. In addition, data and a cyclic redundancy check (CRC) calculation value related to the data may be written in association with each other. In addition, when reading data from the nonvolatile memory 102, the memory access unit 202 may check consistency of data stored in the plurality of locations, or may collate the data with a CRC calculation value of the data. A specific example of such an operation will be described later with reference to FIG. 4. The memory access unit 202 may be realized as the calculation means of the microcomputer 100 executes a program stored in the storage means of the microcomputer 100.

The watchdog timer circuit fault diagnosis unit 201 may output fault information data DT10 (fault information) to the outside of the ECU 10 when diagnosing that the watchdog timer circuit 101 is faulty. The fault information data DT10 may include, for example, information indicating that the watchdog timer circuit 101 is faulty, vehicle information for identifying a vehicle on which the ECU 10 is mounted, and the like. The fault information data DT10 can be used as data for notifying the user or another ECU of information on the fault. The ECU 10 transmits the fault information data DT10 to, for example, the ECU 11.

The ECU 11 may include a fault information reception unit 400 and a lighting unit 401. The fault information reception unit 400 may receive the fault information data DT10 from the ECU 10 (particularly, the microcomputer 100) and turn on the warning light 30 via the lighting unit 401 as necessary.

The watchdog timer circuit 101 can be appropriately designed by a person skilled in the art as a watchdog timer circuit having a known configuration, and an example thereof will be described below. The watchdog timer circuit 101 includes a watchdog pulse reception unit 301 and a reset signal output unit 300.

The watchdog timer circuit 101 includes a timer that measures time therein. The watchdog pulse reception unit 301 receives a pulse (watchdog pulse) from the microcomputer 100 and resets a value of the timer accordingly. When the pulse is not received for a predetermined time or more, the value of the timer reaches a predetermined value without being reset. When the value of the timer reaches the predetermined value, the reset signal output unit 300 transmits a reset signal representing a reset request to the microcomputer 100, thereby resetting the microcomputer 100.

Figure 3:
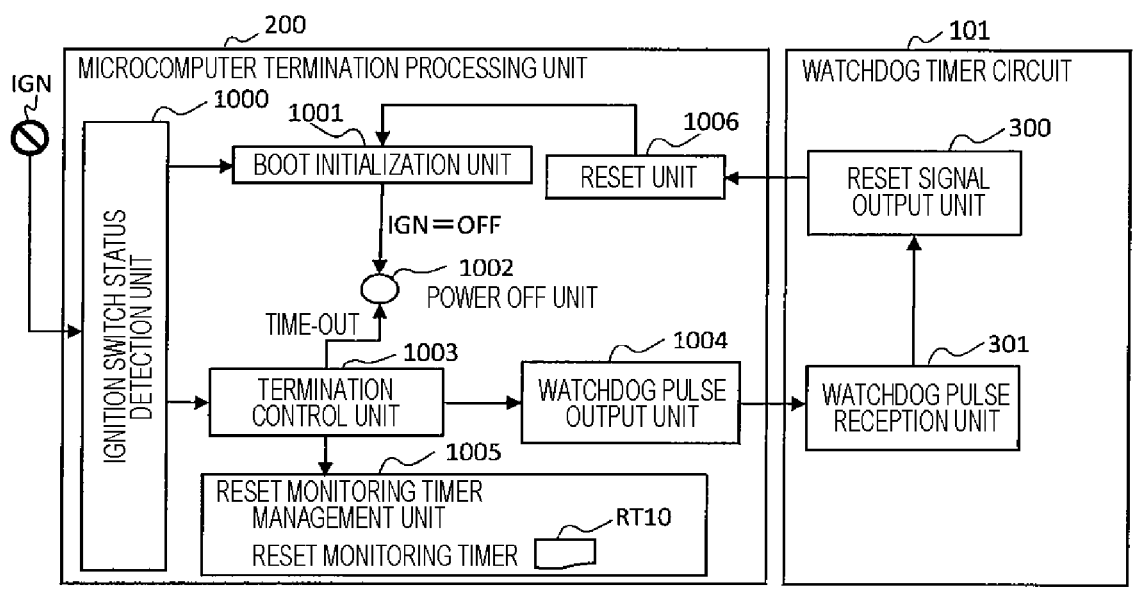
FIG. 3 is a block diagram illustrating an internal configuration of a microcomputer termination processing unit of FIG. 2 in more detail.

FIG. 3 is a block diagram illustrating an internal configuration of the microcomputer termination processing unit 200 in more detail. Note that the block diagram of FIG. 3 is an example, and the microcomputer termination processing unit 200 may have other configurations. The microcomputer termination processing unit 200 may be realized as the calculation means of the microcomputer 100 executes a program stored in the storage means of the microcomputer 100.

As illustrated in FIG. 3, the microcomputer termination processing unit 200 includes an ignition switch status detection unit 1000, a boot initialization unit 1001, a power OFF unit 1002, a termination control unit 1003, a watchdog pulse output unit 1004, a reset monitoring timer management unit 1005, and a reset unit 1006. With such a configuration, the microcomputer termination processing unit 200 executes the termination processing of the microcomputer 100.

The ignition switch status detection unit 1000 detects a state of the ignition switch IGN. For example, it is detected whether the state of the ignition switch IGN is on or off. The ignition switch status detection unit 1000 may be realized as the calculation means of the microcomputer 100 executes a program stored in the storage means of the microcomputer 100.

The boot initialization unit 1001 executes initialization processing of initializing a hard device, a register, a memory, and the like of the microcomputer 100. The initialization processing is executed, for example, immediately after the microcomputer 100 is powered on or immediately after the microcomputer 100 is reset. The boot initialization unit 1001 may be realized as the calculation means of the microcomputer 100 executes a program stored in the storage means of the microcomputer 100.

In addition, the boot initialization unit 1001 may execute processing of turning off the power of the microcomputer 100 depending on a predetermined condition. For example, the power of the microcomputer 100 may be turned off when the off-state of the ignition switch IGN is detected during the initialization processing of the microcomputer 100.

The watchdog pulse output unit 1004 outputs a pulse (or a predetermined signal representing a pulse) to the watchdog timer circuit 101. The watchdog pulse output unit 1004 may be realized as the calculation means of the microcomputer 100 executes a program stored in the storage means of the microcomputer 100.

When the ignition switch status detection unit 1000 detects that the state of the ignition switch is off, the termination control unit 1003 outputs a pulse output stop request to the watchdog pulse output unit 1004. The watchdog pulse output unit 1004 stops outputting the pulse to the watchdog timer circuit 101 in response to the pulse output stop request. In this manner, the microcomputer termination processing unit 200 stops outputting the pulse to the watchdog timer circuit 101 in response to execution of the termination processing of the microcomputer 100. The termination control unit 1003 may be realized as the calculation means of the microcomputer 100 executes a program stored in the storage means of the microcomputer 100.

Here, in a case where the watchdog timer circuit 101 is normal, the microcomputer 100 is reset within a predetermined time after the output of the pulse is stopped. On the other hand, in a case where the watchdog timer circuit 101 is faulty, there is a possibility that the microcomputer 100 is not reset even if the output of the pulse is stopped.

The power OFF unit 1002 turns off the microcomputer 100. For example, the boot initialization unit 1001 and the termination control unit 1003 can turn off the microcomputer 100 via the power OFF unit 1002.

In response to the termination control unit 1003 requesting the watchdog pulse output unit 1004 to stop outputting the pulse to the watchdog timer circuit 101, the reset monitoring timer management unit 1005 monitors an elapsed time since the stop of the output of the pulse. Since the elapsed time is monitored in this manner, it is possible to monitor whether or not the microcomputer 100 is reset within the predetermined time after the output of the pulse is stopped. The reset monitoring timer management unit 1005 may be realized as the calculation means of the microcomputer 100 executes a program stored in the storage means of the microcomputer 100.

The reset monitoring timer management unit 1005 may include a reset monitoring timer RT10 therein, and may perform monitoring by counting down a value of the reset monitoring timer RT10. For example, the value of the reset monitoring timer RT10 is set to N (where N is a numerical value specified in advance) in response to the pulse output stop request of the termination control unit 1003, and this value is counted down with passage of time. When the microcomputer 100 is reset before the reset monitoring timer RT10 counts down to zero, an operation of the reset monitoring timer management unit 1005 is also reset accordingly. Therefore, the count-down of the reset monitoring timer RT10 to zero represents that the microcomputer 100 has not been reset within a time indicated by the value N.

In a case where the microcomputer 100 is not reset within the predetermined time after the output of the pulse is stopped and the elapsed time reaches the predetermined value (for example, in a case where the reset monitoring timer RT10 counts down to zero), the termination control unit 1003 forcibly terminates the microcomputer 100. The forced termination is executed, for example, by turning off the power of the microcomputer 100 via the power OFF unit 1002. In the forced termination, a procedure included in normal termination processing is not necessarily executed.

Even when the reset signal is not output due to the fault of the watchdog timer circuit 101 or the like, the power of the microcomputer 100 can be turned off by executing such forced termination.

When receiving the reset signal from the watchdog timer circuit 101, the reset unit 1006 resets the microcomputer 100 in response thereto. The above forced termination may be executed by resetting the microcomputer 100 via the reset unit 1006. The reset unit 1006 may be realized by an electronic circuit device.

Figure 4:
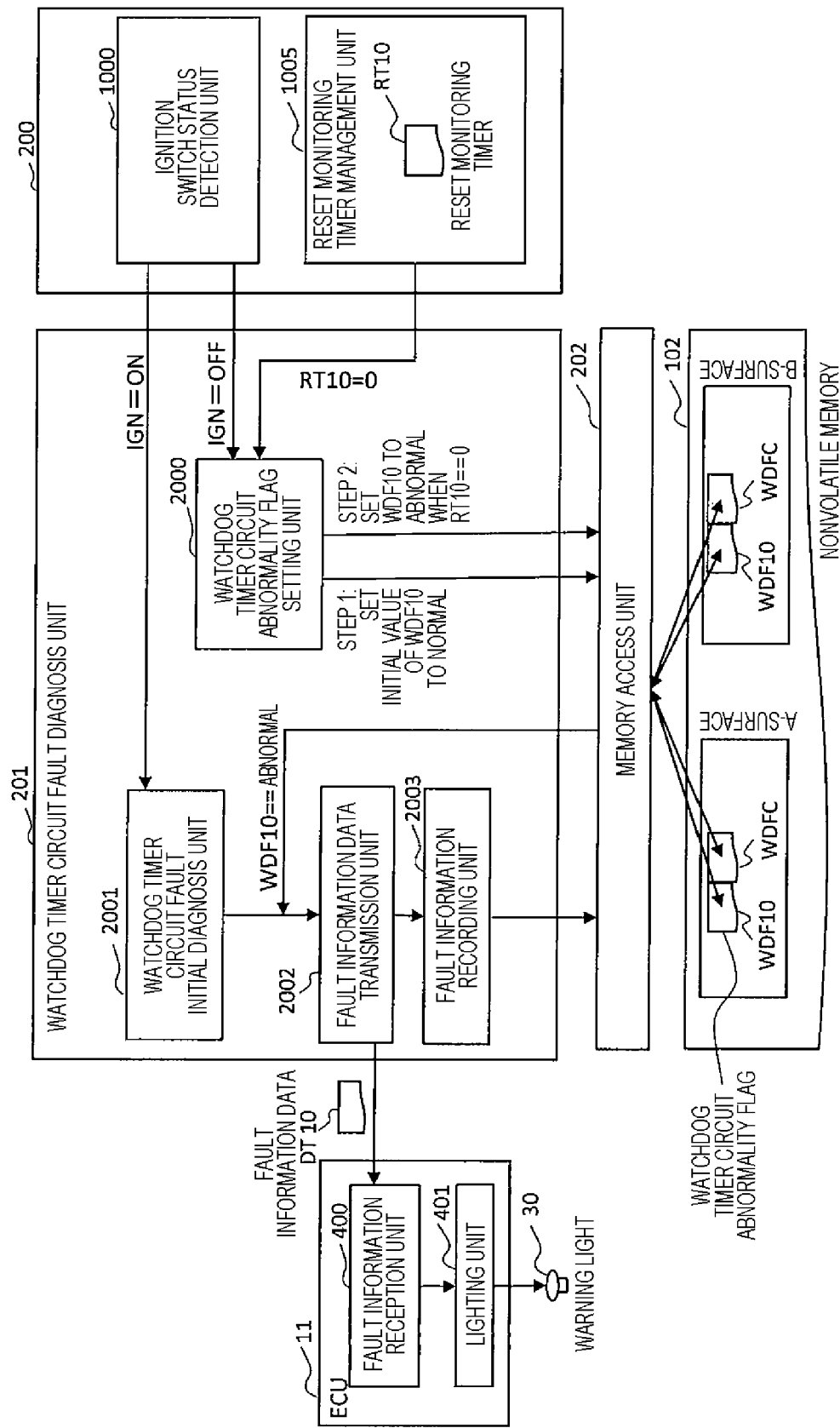
FIG. 4 is a block diagram illustrating an internal configuration of a watchdog timer circuit fault diagnosis unit of FIG. 2 in more detail.

FIG. 4 is a block diagram illustrating an internal configuration of the watchdog timer circuit fault diagnosis unit 201 in more detail. As illustrated in FIG. 4, the watchdog timer circuit fault diagnosis unit 201 includes a watchdog timer circuit abnormality flag setting unit 2000, a watchdog timer circuit fault initial diagnosis unit 2001, a fault information data transmission unit 2002, and a fault information recording unit 2003. With such a configuration, the watchdog timer circuit fault diagnosis unit 201 diagnoses whether or not the watchdog timer circuit 101 is faulty. The watchdog timer circuit fault diagnosis unit 201 may be realized as the calculation means of the microcomputer 100 executes a program stored in the storage means of the microcomputer 100.

In FIG. 4, a single equal sign "=" represents an output of an instruction or information, and two consecutive equal signs "==" represent a branch condition determination process or a state where a branch condition is satisfied.

FIG. 4 also illustrates an example of an internal configuration of the nonvolatile memory 102 related to an operation of the watchdog timer circuit fault diagnosis unit 201. The nonvolatile memory 102 stores information indicating whether an abnormality has occurred in the watchdog timer circuit 101. This information is represented, for example, by a value of a watchdog timer circuit abnormality flag WDF10. A fact that the value of the watchdog timer circuit abnormality flag WDF10 is normal is normality information indicating that no abnormality occurs in the watchdog timer circuit 101, and a fact that the value of the watchdog timer circuit abnormality flag WDF10 is abnormal is abnormality information indicating that an abnormality occurs in the watchdog timer circuit 101.

The information written in the nonvolatile memory 102 may be stored in a redundant manner. For example, the memory access unit 202 may write the value of the watchdog timer circuit abnormality flag WDF10 in each of an A-surface (first area) and a B-surface (second area) of the nonvolatile memory 102 in response to an instruction from the watchdog timer circuit fault diagnosis unit 201. In addition, the memory access unit 202 may verify consistency between the value read from the A-surface and the value read from the B-surface when reading the value of the watchdog timer circuit abnormality flag WDF10 from the nonvolatile memory 102 in response to an instruction from the watchdog timer circuit fault diagnosis unit 201. Furthermore, known error processing may be executed in a case where there is no consistency. With such processing, the information can be stored in a redundant manner.

In addition, when writing the value of the watchdog timer circuit abnormality flag WDF10 in response to an instruction from the watchdog timer circuit fault diagnosis unit 201, the memory access unit 202 may write the value of the flag itself and a CRC calculation value WDFC calculated according to the value of the flag in association with each other. In this case, the abnormality information includes the watchdog timer circuit abnormality flag WDF10 and the CRC calculation value WDFC related to the watchdog timer circuit abnormality flag WDF10. In addition, in this case, the memory access unit 202 may collate the watchdog timer circuit abnormality flag WDF10 and the CRC calculation value WDFC when reading the abnormality information in response to an instruction from the watchdog timer circuit fault diagnosis unit 201. Furthermore, known error processing may be executed in a case where there is no consistency as a result of the collation. With such processing, the information can be stored in a redundant manner.

The watchdog timer circuit abnormality flag setting unit 2000 sets the value of the watchdog timer circuit abnormality flag WDF10 via the memory access unit 202. For example, when the state of the ignition switch changes from ON to OFF (which can be detected by the ignition switch status detection unit 1000), the value of the watchdog timer circuit abnormality flag WDF10 is immediately set to normal (Step 1 of FIG. 4). Note that the output of the pulse from the watchdog pulse output unit 1004 is stopped at this point as described above. The watchdog timer circuit abnormality flag setting unit 2000 may be realized as the calculation means of the microcomputer 100 executes a program stored in the storage means of the microcomputer 100.

Thereafter, that is, when the reset signal is not output from the watchdog timer circuit 101 even after the predetermined time has elapsed since the stop of the output of the pulse (which can be detected by the reset monitoring timer RT10 counting down to zero), the watchdog timer circuit abnormality flag setting unit 2000 sets the value of the watchdog timer circuit abnormality flag WDF10 to abnormal (Step 2 in FIG. 4). As a result, the abnormality information indicating that an abnormality has occurred in the watchdog timer circuit 101 is written into the nonvolatile memory 102.

After the microcomputer 100 is activated (for example during the initialization processing or after the initialization processing and before the typical processing), the watchdog timer circuit fault initial diagnosis unit 2001 acquires the value of the watchdog timer circuit abnormality flag WDF10 stored in the nonvolatile memory 102 via the memory access unit 202. Then, whether or not the watchdog timer circuit 101 is faulty is diagnosed based on the value of this flag. The watchdog timer circuit fault initial diagnosis unit 2001 may be realized as the calculation means of the microcomputer 100 executes a program stored in the storage means of the microcomputer 100.

For example, if the value of the watchdog timer circuit abnormality flag WDF10 is abnormal, the watchdog timer circuit fault initial diagnosis unit 2001 diagnoses that the watchdog timer circuit 101 is abnormal. On the other hand, when the value of the watchdog timer circuit abnormality flag WDF10 is normal, the watchdog timer circuit fault initial diagnosis unit 2001 diagnoses that the watchdog timer circuit 101 is normal.

In this manner, the watchdog timer circuit fault initial diagnosis unit 2001 diagnoses that the watchdog timer circuit 101 is abnormal (that is, faulty) when the abnormality information is stored in the nonvolatile memory 102 at the time of activating the microcomputer 100. Therefore, it is unnecessary to execute diagnosis processing that requires a long time at the time of activation, and the typical processing of the computer can be quickly started.

When the watchdog timer circuit fault initial diagnosis unit 2001 diagnoses that the watchdog timer circuit 101 is abnormal (that is, faulty), the fault information data transmission unit 2002 transmits the fault information data DT10 to the in-vehicle LAN 20. As a result, the fault of the watchdog timer circuit 101 can be notified to the outside. The fault information data transmission unit 2002 may be realized as the calculation means of the microcomputer 100 executes a program stored in the storage means of the microcomputer 100.

A transmission destination of the fault information data DT10 may be, for example, the ECU 11 as illustrated in the drawing. The ECU 11 receives the fault information data DT10 and turns on the warning light 30. Note that the fault information data DT10 is used as a signal for turning on the warning light 30 in this example, but the signal for turning on the warning light 30 is not limited to the fault information data DT10, and may be a signal having another format or content. Since the warning light 30 is turned on in this manner, the user can know the fault of the watchdog timer circuit 101.

In addition, the transmission destination of the fault information data DT10 may be, for example, the diagnostic tool 2 connected via the OBD connector 31 (see FIG. 1). In this manner, it is possible to execute additional diagnosis processing using the information on the fault of the watchdog timer circuit 101 in the diagnostic tool 2.

When the watchdog timer circuit fault initial diagnosis unit 2001 diagnoses that the watchdog timer circuit 101 is abnormal (that is, faulty), the fault information recording unit 2003 writes the fault information data DT10 in the nonvolatile memory 102 via the memory access unit 202. As a result, the detailed information on the fault of the watchdog timer circuit 101 to be stored for a long period of time and can be referenced at any time. The fault information recording unit 2003 may be realized as the calculation means of the microcomputer 100 executes a program stored in the storage means of the microcomputer 100.

Figure 5:
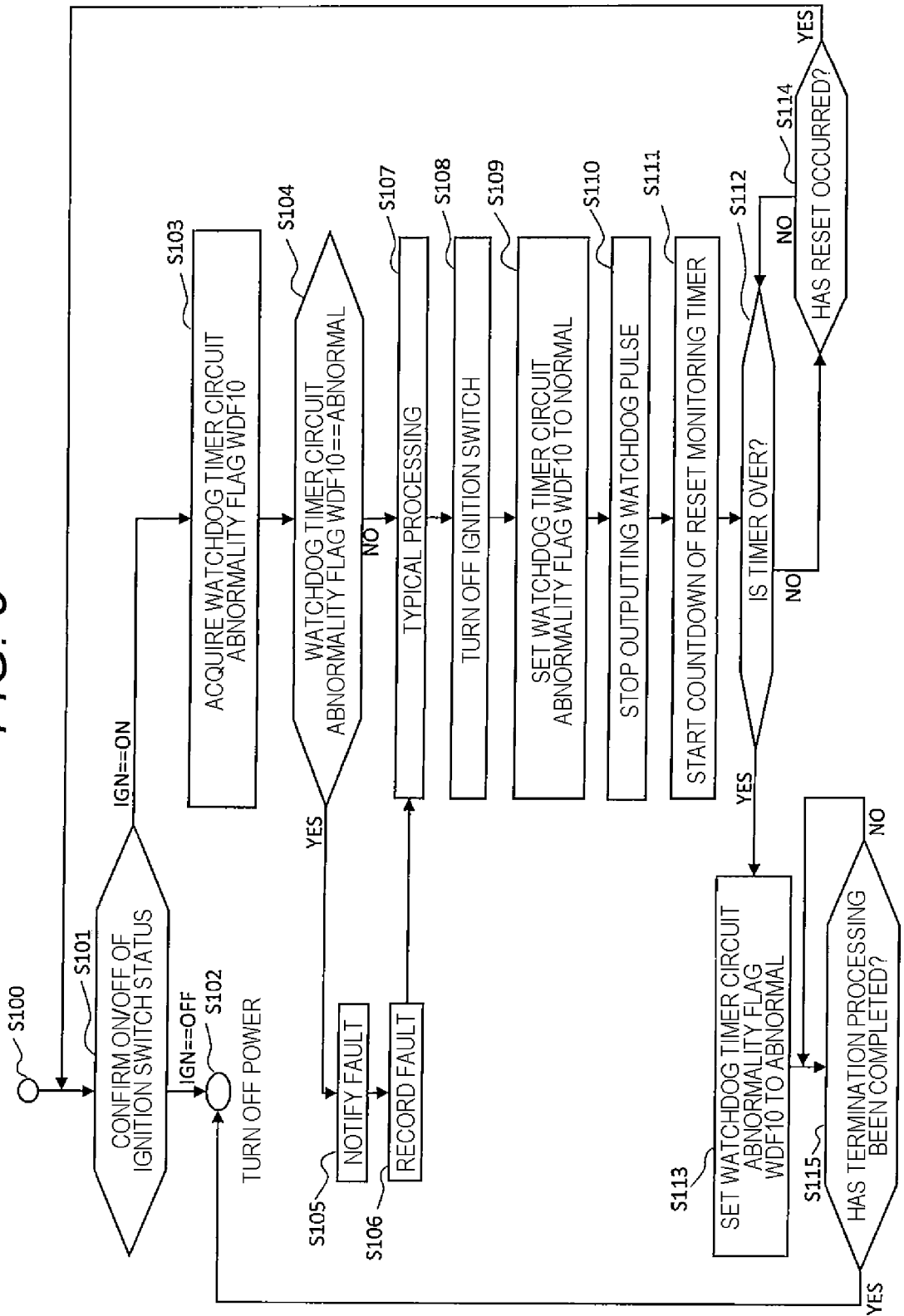
FIG. 5 is a flowchart illustrating an operation of the electronic control unit of FIG. 1.

FIG. 5 is a flowchart illustrating an operation of the ECU 10. This drawing particularly represents the operation of the microcomputer 100. In FIG. 5, two consecutive equal symbols "==" represent a branch condition determination process or a state where a branch condition is satisfied. The operation of FIG. 5 is started from Step S100 in response to power-on of the microcomputer 100. The subsequent processing is as follows.

Step S100: The microcomputer 100 is powered on.

Step S101: The ignition switch status detection unit 1000 detects a state of the ignition switch IGN. When the state of the ignition switch IGN is OFF, the processing proceeds to Step S102. When the state of the ignition switch IGN is ON, the processing proceeds to Step S103.

Step S102: The power OFF unit 1002 turns off the power of the microcomputer 100.

Step S103: The watchdog timer circuit fault initial diagnosis unit 2001 acquires a value of the watchdog timer circuit abnormality flag WDF10 stored in the nonvolatile memory 102 via the memory access unit 202.

Step S104: The watchdog timer circuit fault initial diagnosis unit 2001 diagnoses the presence or absence of a fault of the watchdog timer circuit 101 based on the value of the watchdog timer circuit abnormality flag WDF10. When the watchdog timer circuit abnormality flag WDF10 is abnormal, the processing proceeds to Step S105. This corresponds to determining that the watchdog timer circuit 101 is faulty. On the other hand, when the value of the watchdog timer circuit abnormality flag is normal, the processing proceeds to Step S107. This corresponds to determining that the watchdog timer circuit 101 is not faulty.

Step S105: The fault information data transmission unit 2002 transmits the fault information data DT10 to the ECU 11 via the in-vehicle LAN 20.

Step S106: The fault information recording unit 2003 records the fault information in the nonvolatile memory 102 via the memory access unit 202.

Step S107: The typical processing of the microcomputer 100 is executed. The typical processing includes, for example, processing related to traveling of the vehicle. During execution of Step S107, the watchdog pulse output unit 1004 continues to output a watchdog pulse.

Step S108: During the execution of Step S107, the ignition switch status detection unit 1000 detects that the state of the ignition switch IGN is turned off. In response thereto, the microcomputer 100 starts executing a termination sequence, and the processing proceeds to Step S109.

Step S109: When the microcomputer 100 starts executing the termination sequence, the watchdog timer circuit abnormality flag setting unit 2000 sets the value of the watchdog timer circuit abnormality flag WDF10, stored in the nonvolatile memory 102, to normal via the memory access unit 202.

Step S110: The watchdog pulse output unit 1004 stops outputting the watchdog pulse.

Step S111: After the watchdog pulse output unit 1004 stops outputting the watchdog pulse (for example, immediately after the stop), the reset monitoring timer management unit 1005 starts countdown of the reset monitoring timer RT10. This is processing for confirming whether or not reset occurs within a certain period of time.

Step S112: When the microcomputer 100 is not reset even after the reset monitoring timer RT10 becomes zero, the processing proceeds to Step S113. This corresponds to determining that the watchdog timer circuit 101 is abnormal. On the other hand, when the reset monitoring timer RT10 does not count down to zero, the processing proceeds to Step S114 to wait for reception of a reset signal.

Step S113: The watchdog timer circuit abnormality flag setting unit 2000 sets the value of the watchdog timer circuit abnormality flag WDF10 stored in the nonvolatile memory 102 to abnormal via the memory access unit 202. Then, the processing proceeds to Step S115.

Step S114: When the reset signal is output from the watchdog timer circuit 101, the microcomputer is reset, so that the processing proceeds to Step S101. When the reset signal is not output, the processing proceeds to Step S112.

Step S115: The termination control unit 1003 confirms whether the termination processing of the microcomputer 100 has been completed. When the termination processing has been completed, the processing proceeds to Step S102 in order to turn off the power of the microcomputer 100. If the termination processing has not been completed, the completion of the termination processing is awaited in Step S115.

REFERENCE SIGNS LIST 1 overall vehicle system
2 diagnostic tool
10 ECU (electronic control unit)
11 ECU
12 ECU
13 ECU
DT10 fault information data (fault information)
20 in-vehicle LAN (in-vehicle communication network)
30 warning light
31 OBD connector
IGN ignition switch
100 microcomputer (computer)
101 watchdog timer circuit
102 nonvolatile memory
200 microcomputer termination processing unit (computer termination processing unit)
201 watchdog timer circuit fault diagnosis unit (fault diagnosis unit)
202 memory access unit
300 reset signal output unit
301 watchdog pulse reception unit
400 fault information reception unit
401 lighting unit
1000 ignition switch status detection unit
1001 boot initialization unit
1002 power OFF unit
1003 termination control unit
1004 watchdog pulse output unit
1005 reset monitoring timer management unit
RT10 reset monitoring timer
1006 reset unit
2000 watchdog timer circuit abnormality flag setting unit
2001 watchdog timer circuit fault initial diagnosis unit
2002 fault information data transmission unit
2003 fault information recording unit
WDF10 watchdog timer circuit abnormality flag (abnormality flag), WDFC (CRC calculation value)

The invention claimed is:

1. An electronic control unit comprising:
a computer;
a nonvolatile memory; and
a watchdog timer circuit that monitors the computer,
wherein the computer includes:
a computer termination processing unit that executes termination processing of the computer; and
a fault diagnosis unit that diagnoses whether the watchdog timer circuit is faulty,
the computer termination processing unit stops output of a pulse to the watchdog timer circuit in response to execution of the termination processing of the computer, and
the fault diagnosis unit writes abnormality information indicating that an abnormality has occurred in the watchdog timer circuit into the nonvolatile memory when a reset signal is not output from the watchdog timer circuit even when a predetermined time has elapsed since the stop of the output of the pulse, wherein
the computer further includes a memory access unit that accesses the nonvolatile memory, and
the memory access unit
writes an abnormality flag and a CRC calculation value related to the abnormality flag in the nonvolatile memory in association with each other as the abnormality information, and
collates the abnormality flag and the CRC calculation value when reading the abnormality information.

2. The electronic control unit according to claim 1, wherein
the computer termination processing unit includes:
a reset unit that resets the computer in response to reception of a reset signal from the watchdog timer circuit;
an ignition switch status detection unit that detects a state of an ignition switch; and a boot initialization unit that turns off power of the computer when an off-state of the ignition switch is detected during initialization processing of the computer.

3. The electronic control unit according to claim 1, wherein
the computer termination processing unit includes:
a watchdog pulse output unit that outputs the pulse to the watchdog timer circuit;
a reset monitoring timer management unit that monitors an elapsed time since the stop of the output of the pulse; and
a termination control unit that forcibly terminates the computer when the elapsed time reaches a predetermined value.

4. An electronic control unit comprising:
a computer;
a nonvolatile memory; and
a watchdog timer circuit that monitors the computer,
wherein the computer includes:
a computer termination processing unit that executes termination processing of the computer; and
a fault diagnosis unit that diagnoses whether the watchdog timer circuit is faulty,
the computer termination processing unit stops output of a pulse to the watchdog timer circuit in response to execution of the termination processing of the computer, and
the fault diagnosis unit writes abnormality information indicating that an abnormality has occurred in the watchdog timer circuit into the nonvolatile memory when a reset signal is not output from the watchdog timer circuit even when a predetermined time has elapsed since the stop of the output of the pulse,
wherein
the computer further includes a memory access unit that accesses the nonvolatile memory, and
the memory access unit
writes the abnormality information in each of a first area and a second area of the nonvolatile memory, and
verifies consistency between the abnormality information read from the first area and the abnormality information read from the second area when the abnormality information is read from the nonvolatile memory.

5. The electronic control unit according to claim 1, wherein
the fault diagnosis unit includes a watchdog timer circuit fault initial diagnosis unit, and
the watchdog timer circuit fault initial diagnosis unit diagnoses that the watchdog timer circuit is faulty when the abnormality information is stored in the nonvolatile memory at a time of activation of the computer.

6. The electronic control unit according to claim 1, wherein
the fault diagnosis unit includes:
a fault information data transmission unit that transmits fault information to an in-vehicle communication network when it is diagnosed that the watchdog timer circuit is faulty; and
a fault information recording unit that writes the fault information in the nonvolatile memory when it is diagnosed that the watchdog timer circuit is faulty.

7. The electronic control unit according to claim 1, wherein
the fault diagnosis unit outputs a signal for turning on a warning light when it is diagnosed that the watchdog timer circuit is faulty.

* * * * *